(12) United States Patent
Härkönen (10) Patent No.: US 9,573,790 B2
(45) Date of Patent: Feb. 21, 2017

(54) SUSPENSION DEVICE AND SUSPENSION ARRANGEMENT

(75) Inventor: Ari Härkönen, Riihimäki (FI)

(73) Assignee: KONE CORPORATION, Helsinki (FI)

( * ) Notice: Subject to any disclaimer, the term of this patent is extended or adjusted under 35 U.S.C. 154(b) by 560 days.

(21) Appl. No.: 13/479,106

(22) Filed: May 23, 2012

(65) Prior Publication Data

US 2012/0241260 A1 Sep. 27, 2012

Related U.S. Application Data

(63) Continuation of application No. PCT/FI2010/050868, filed on Nov. 1, 2010.

(30) Foreign Application Priority Data

Nov. 1, 2010 (FI) ...................................... 20096238

(51) Int. Cl.
  *B66B 7/08* (2006.01)
  *F16G 11/02* (2006.01)
  *B66B 7/06* (2006.01)

(52) U.S. Cl.
  CPC ............. *B66B 7/085* (2013.01); *B66B 7/064* (2013.01); *F16G 11/025* (2013.01)

(58) Field of Classification Search
  CPC ........ B66B 7/085; B66B 7/064; F16G 11/025; F16G 11/04; F16G 11/03
  USPC .......................... 187/413; 24/115 R, 132 WL
  See application file for complete search history.

(56) References Cited

U.S. PATENT DOCUMENTS

| 141,706 | A | * | 8/1873 | Downing | ...................... | 403/60 |
| 157,435 | A | * | 12/1874 | Wray | .......................... | 24/115 R |
| 4,721,285 | A | * | 1/1988 | McMichael | ................... | 254/333 |
| 5,080,199 | A | * | 1/1992 | McCallum, III | .............. | 187/413 |
| 5,957,243 | A | | 9/1999 | Root et al. | | |
| 6,341,669 | B1 | * | 1/2002 | St. Pierre et al. | ............ | 187/412 |
| 2005/0133312 | A1 | * | 6/2005 | Kaczmarek et al. | ......... | 187/266 |
| 2008/0236957 | A1 | | 10/2008 | Eichhorn et al. | | |
| 2009/0301822 | A1 | * | 12/2009 | Keszthelyi | ..................... | 187/413 |

FOREIGN PATENT DOCUMENTS

| EP | 1026115 A1 | 8/2000 | |
| EP | 10 832 692.7 | 10/2015 | |
| FR | 2 452 769 A1 | 10/1980 | |
| JP | 54122542 A * | 9/1979 | ............... B66B 7/06 |
| JP | 55-94045 A | 7/1980 | |
| JP | 3-106781 A | 5/1991 | |
| JP | 4-201966 A | 7/1992 | |
| JP | 8-119558 A | 5/1996 | |

(Continued)

OTHER PUBLICATIONS

AIPN Translation, JP 2009-126640 A, Nov. 30, 2015, pp. 1-13.*

*Primary Examiner* — William A Rivera
*Assistant Examiner* — Stefan Kruer
(74) *Attorney, Agent, or Firm* — Birch, Stewart, Kolasch & Birch, LLP (57) ABSTRACT

A suspension device and a suspension arrangement for suspending a cable in an elevator hoistway are provided. The suspension device includes a mechanical fixing interface for fixing the suspension device to a supporting structure. The suspension device also includes a fixing part of the cable, which fixing part of the cable is made to be turnable in relation to the mechanical fixing interface.

11 Claims, 5 Drawing Sheets

(56) References Cited

FOREIGN PATENT DOCUMENTS

| | | | |
|---|---|---|---|
| JP | 8-245122 A | 9/1996 | |
| JP | 2005-350214 A | 12/2005 | |
| JP | 2009-126640 A | 6/2009 | |
| WO | WO 0153187 A1 * | 7/2001 | ............... B66B 7/08 |
| WO | WO 0200541 A1 * | 1/2002 | ............... F16G 11/04 |
| WO | WO 2004036115 A1 * | 4/2004 | ............... F16G 11/10 |
| WO | 2007/142081 A1 | 12/2007 | |

* cited by examiner

SUSPENSION DEVICE AND SUSPENSION ARRANGEMENT

This application is a Continuation of PCT International Application No. PCT/FI2010/050868 filed on Nov. 1, 2010, which claims the benefit to patent application Ser. No. 20096238 filed in Finland, on Nov. 24, 2009. The entire contents of all of the above applications are hereby incorporated by reference into the present application.

FIELD OF THE INVENTION

The invention relates to solutions for suspending a cable in an elevator hoistway, and more particularly to a suspension device and to a suspension arrangement for suspending a cable in an elevator hoistway.

DESCRIPTION OF PRIOR ART

A building might sway e.g. from the effect of wind. Especially in tall buildings, the swaying can be substantial. The trailing cables suspended in an elevator hoistway might swing owing to the swaying of the building and thereby catch on the structures of the elevator hoistway or on components that are in the elevator hoistway.

It has been endeavored to reduce the swinging of a trailing cable by suspending the trailing cable in connection with a wall part of the elevator hoistway and/or in connection with the elevator car with a suspension means that moves linearly on the horizontal plane. This type of solution is presented e.g. in publication JP3106781. The solution requires an active control, with which the linearly movable suspension means is controlled, for it to function.

SUMMARY OF THE INVENTION

The solution resolves a problem for reducing the swinging of a cable, more particularly of a trailing cable, suspended in an elevator hoistway. According to the invention, swinging of a cable suspended in an elevator hoistway can be substantially reduced by suspending the cable with a type of suspension device with which the angle of rotation of the suspended cable can be adjusted. The purpose of this invention is to disclose this type of improved suspension device and suspension arrangement for suspending a trailing cable in an elevator system. In relation to the characteristic attributes of the invention, reference is made to the claims.

The invention relates to a suspension device for suspending a cable, preferably a trailing cable, in an elevator hoistway. The aforementioned suspension device comprises an adaptor for fixing the suspension device to a support structure. The suspension device also comprises a fixing part of a cable. The fixing part of the cable is made to be turnable in relation to the adaptor, for adjusting the angle of rotation $\epsilon$ of the cable, preferably a trailing cable, to be suspended. The suspension device according to the invention can be used e.g. for suspending a trailing cable or compensating rope in an elevator hoistway. For example, when the elevator car moves, the centrifugal force acting at the point of the direction change of the trailing cable causes swinging in a twisted trailing cable. With the suspension device according to the invention swinging of a trailing cable can be effectively reduced by adjusting the angle of rotation of the cable such that twisting of the suspended cable disappears. In the invention the term trailing cable refers to a type of cable wherein control signals and/or operating electricity and/or information about the status of the safety circuit of the elevator are transferred between the elevator car and a control unit disposed elsewhere in the building. The aforementioned control unit can be disposed e.g. on a floor level, in connection with a stationary structure of the elevator hoistway and/or in the machine room. Consequently the invention is suited to both elevator systems with machine rooms and elevator systems without machine rooms. In the invention the term compensating rope refers to a rope that compensates with its mass the force difference acting on the traction sheave of the hoisting machine that is produced by the weight of the hoisting ropes of the elevator, said compensating rope generally being fitted to be suspended between the elevator car and the counterweight.

According to one or more embodiments of the invention, the suspension device comprises means for locking the relative position of the fixing part of the cable and the adaptor. The angle of rotation of the adjusted cable can thus be locked into its position in relation to the adaptor, in which case the cable is no longer able to turn in the suspension device.

According to one or more embodiments of the invention, the fixing part of the cable is connected to the adaptor via a bearing. The bearing enables the turning of the fixing part in relation to the adaptor. Preferably a thrust bearing can be used as a bearing.

According to one or more embodiments of the invention, the fixing part of the cable is fitted to turn in relation to the adaptor around an essentially vertical axis of rotation.

According to one or more embodiments of the invention, the fixing part of a cable comprises means for fixing the supporting wire of the cable. The term supporting wire refers to e.g. a wire, chain or corresponding that is fixed to a trailing cable on the inside or the outside of the trailing cable and that travels with and supports the trailing cable, which supporting wire is used to support and bear the weight of the trailing cable especially with large travel heights.

According to one or more embodiments of the invention, the means for fixing the supporting wire of a cable comprise a fixing wheel. The supporting wire can be fixed around the fixing wheel, in which case the force acting on the fixing point of the supporting wire is distributed more evenly. This reduces fatigue of the fixing point of the supporting wire and improves the reliability of the fixing.

According to one or more embodiments of the invention, the fixing part of a cable comprises a flexible flap. The fixing part is preferably of two parts, and the flexible flap is fitted between the parts to connect the parts to each other. In a preferred embodiment of the invention the first part of the two-part fixing part of the cable is connected in a manner that allows rotation in connection with the adaptor, and the supporting wire of the cable is fixed to the second part of the two-part fixing part, in which case with the flexible flap between the parts in the two-part fixing part of the cable, vibration traveling from the supporting wire of the cable via the adaptor to the supporting structure of the suspension device can be damped. Owing to the flexible flap, the supporting wire of the cable fixed to the second part of the two-part fixing part is also able to move. The swinging energy of a trailing cable is also converted into heat in the flexible flap, which damps the swinging of the trailing cable. The flexible flap is preferably made of an elastic material, such as rubber.

According to one or more embodiments of the invention, the suspension device comprises a cable trough, and the aforementioned cable trough is fixed to the fixing part of a cable. The cable can be fitted into a cable trough, in which case the cable running in the cable trough can be aligned and/or supported in the desired manner.

According to the second aspect, the invention relates to a suspension arrangement for suspending a trailing cable in an elevator system, which elevator system comprises an elevator car to be moved in an essentially vertical direction in an elevator hoistway. The suspension arrangement comprises any of the suspension devices disclosed above, as a first suspension device, for suspending the first end of a trailing cable in connection with a supporting structure of the elevator hoistway. The suspension arrangement also comprises any of the suspension devices disclosed above, as a second suspension device, for suspending the second end of the trailing cable in connection with the elevator car. According to the invention the same suspension device can be used for suspending both ends of a trailing cable by selecting the adaptor on the basis of the suspension point.

According to one or more embodiments of the invention, the adaptor of the aforementioned first suspension device for fixing the suspension device to a supporting structure comprises an L-shaped fixing means, and the fixing part of the cable is connected to a part to be installed horizontally of the L-shaped fixing means via a bearing, and holes for fixing pins have been made in the part to be installed vertically of the L-shaped fixing means, for fixing the L-shaped fixing means to a vertically aligned supporting structure of the elevator hoistway. The vertical supporting structure of the elevator hoistway can be e.g. a wall part of the elevator hoistway or a vertical beam.

According to one or more embodiments of the invention, the adaptor of the aforementioned second suspension device for fixing the suspension device to a supporting structure comprises a fixing plate, for fixing the second suspension device to a horizontal part of a supporting structure of an elevator car. A bearing can be fitted inside the fixing plate, and the fixing plate can be fixed to a horizontal part, e.g. to the inside of a steel beam, of a supporting structure of the elevator car. The fixing part of the cable can be connected to a thrust bearing of the fixing plate e.g. with a bearing journal.

The aforementioned summary, as well as the additional features and advantages of the invention presented below, will be better understood by the aid of the following description of some embodiments, said description not limiting the scope of application of the invention.

MORE DETAILED DESCRIPTION OF PREFERRED EMBODIMENTS OF THE INVENTION

Figure 1A:
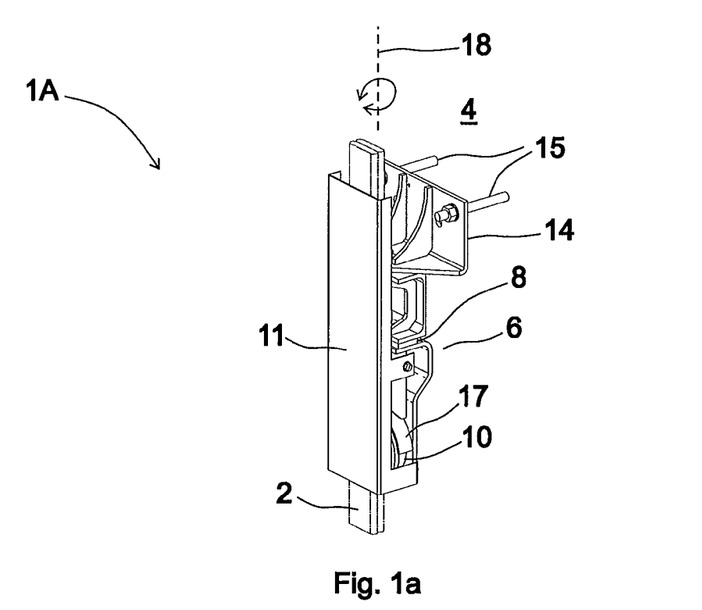
FIGS. 1a, 1b and 1c present one suspension device according to the invention, said device to be fixed to a wall part of the elevator hoistway
Figure 1B:
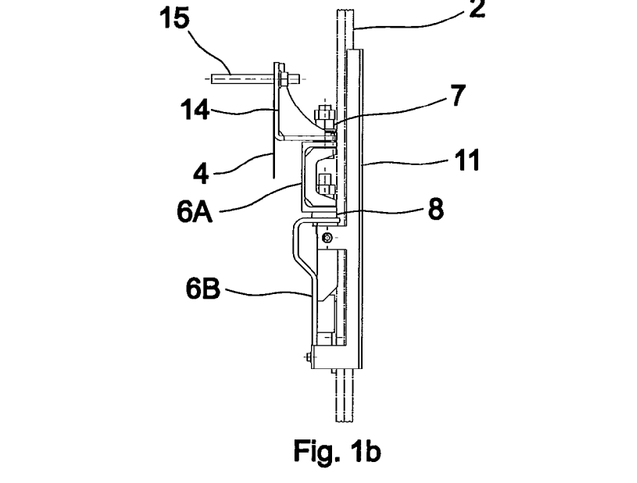
Figure 1C:
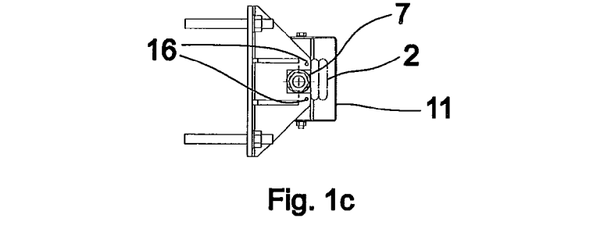

FIGS. 1a, 1b and 1c present a suspension device 1A for suspending the end of a trailing cable 2 e.g. in connection with a wall part of an elevator hoistway. FIG. 1a presents an oblique top view of the suspension device, FIG. 1b presents a side view of the suspension device, and FIG. 1c presents a top view of the suspension device. The frame part of a thrust bearing 7 has been fitted into a part to be installed horizontally of the L-shaped fixing means 14 of the suspension device. The fixing part 6 of the trailing cable is connected to a rotating part of the thrust bearing 7 such that the fixing part 6 of the trailing cable is able to turn in relation to the L-shaped fixing means 14, around an essentially vertical axis of rotation 18. The supporting wire of the trailing cable 2 is fixed around a fixing wheel 10 in the lower part 6b of the two-part fixing part 6 of the trailing cable. A jump-guard 17 is also disposed around the fixing wheel 10, with which jump-guard it is ensured that the supporting wire does not fall off the fixing wheel 10. A flexible flap 8 made of rubber is fitted between the parts 6A, 6B of the two-part fixing part 6, and the fixing parts 6A, 6B are pressed against each other with a nut connected to a bolt that passes through the flexible flap 8. The compression force between the fixing parts 6A, 6B is thus dimensioned to be sufficiently small that the fixing parts 6A, 6B are able to move slightly in relation to each other. In this case with the flexible flap 8 vibration traveling from the supporting wire of the trailing cable to the L-shaped fixing means 14 and onwards to the vertically aligned supporting structure 4 of the suspension device 1A can be damped. The swinging energy of a trailing cable 2 is also converted into heat in the flexible flap 8, which damps the swinging of the trailing cable 2. The nut fixing of the parts 6A, 6B is ensured with a separate locking nut.

Figure 2A:
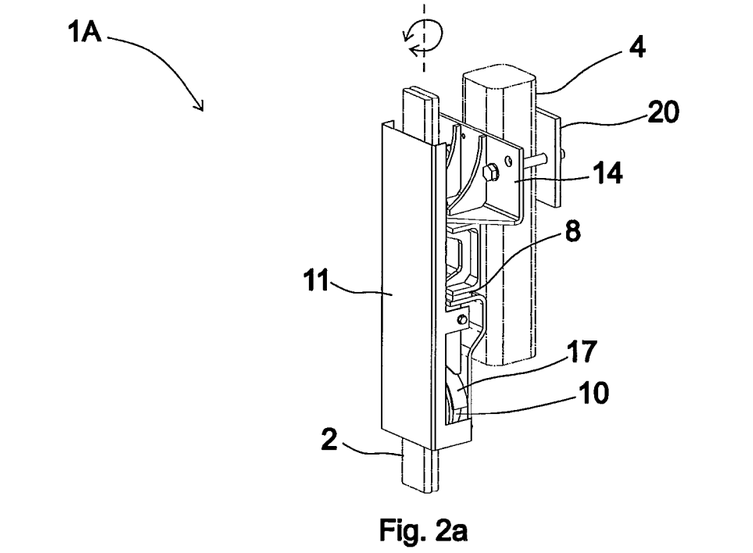
FIGS. 2a, 2b and 2c present one suspension device according to the invention, said device to be fixed to a vertical beam of the elevator hoistway
Figure 2B:
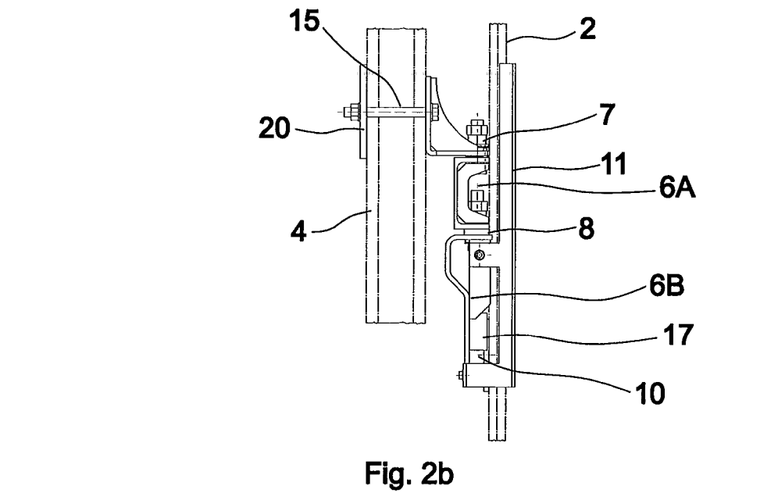
Figure 2C:
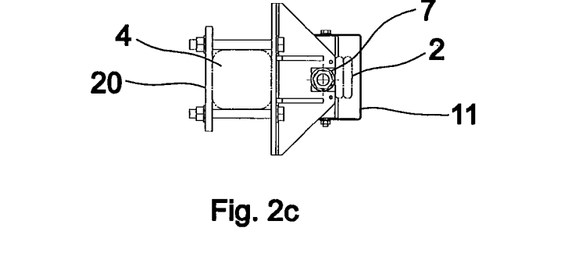

Holes have been made in a part to be installed vertically of the L-shaped fixing means 14, into which holes fixing pins 15 are fitted. By means of the fixing pins 15, the L-shaped fixing means 14 can be fixed e.g. to a wall part of the elevator hoistway. In the embodiment presented in FIGS. 2a, 2b and 2c, a corresponding suspension device 1A is fixed by means of the fixing pins 15 of the L-shaped fixing means 14 and also by means of the locking plate 20 to a vertical support beam 4 in the elevator hoistway.

The suspension device 1A also comprises a cable trough 11, on the inside of which the flat cable used as a trailing cable travels in the suspension device. From the cable trough 11 the trailing cable 2 is taken e.g. to a connector disposed on a wall part 4 of the elevator hoistway. The cable trough 11 is fixed to the fixing part 6 of the trailing cable such that the cable trough 11 turns along with the fixing part 6 of the trailing cable. The cable trough 11 can also contain holes, and the trailing cable 2 can be fixed to the cable trough 11 e.g. with cable ties taken through the holes.

The position of the fixing part 6 of the trailing cable in relation to the L-shaped fixing means 14 is locked with roll pins 16 that go through the L-shaped fixing means 14 and the fixing part 6 of the trailing cable. Locking is performed after the twisting of the trailing cable 2 has first been removed by adjusting the angle of rotation of the trailing cable by turning the fixing part 6 of the trailing cable in relation to the L-shaped fixing means 14. Many other types of locking pins could be used for locking instead of the roll pins 16.

Figure 3A:
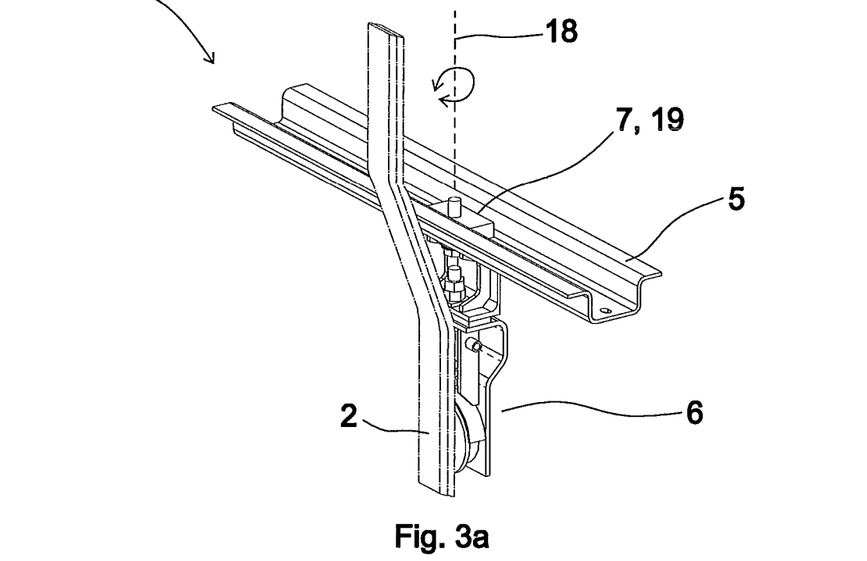
FIGS. 3a, 3b and 3c present one suspension device according to the invention, said device to be fixed to the sling of an elevator car
Figure 3B:
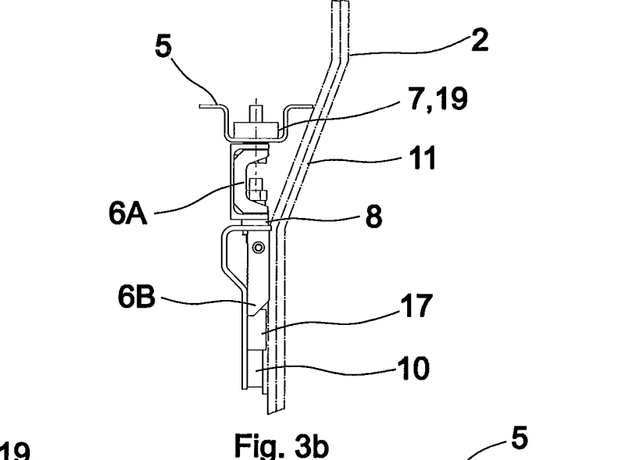
Figure 3C:
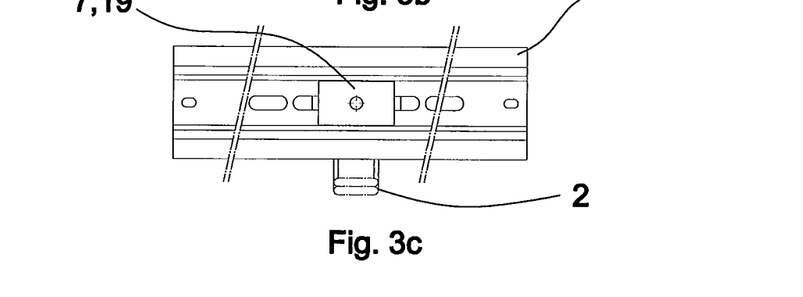

FIGS. 3a, 3b and 3c present a suspension device 1B for suspending the end of a trailing cable 2 e.g. on a horizontal support beam 5 of the sling of an elevator car. FIG. 3a presents an oblique top view of the suspension device, FIG. 3b presents a side view of the suspension device, and FIG. 3c presents a top view of the suspension device. The suspension device 1B according to FIGS. 3a, 3b, 3c differs from the suspension device 1A presented in the preceding embodiments in that the suspension device 1B does not comprise a cable trough 11 nor an L-shaped fixing means 14. The suspension device 1B comprises a fixing plate 19, inside which a thrust bearing 7 is fitted. The fixing plate is fitted inside a horizontal support beam 5 of the sling of the elevator car. The fixing part 6 of the trailing cable connects the fixing plate 19 to the thrust bearing 7 with a bearing journal such that the fixing part 6 of the trailing cable is able to turn in relation to the fixing plate 19, and thus in relation to the horizontal support beam 5 of the sling of the elevator car.

By means of the suspension devices 1A, 1B described above, a trailing cable 2 of an elevator car can be suspended e.g. in connection with a wall structure of the elevator hoistway, from a vertical support beam 4 in the elevator hoistway or from a horizontal support beam 5 of the elevator car by changing just the adaptor 14, 15, 19, 20 for fixing the suspension device to a supporting structure 4, 5.

Figure 4:
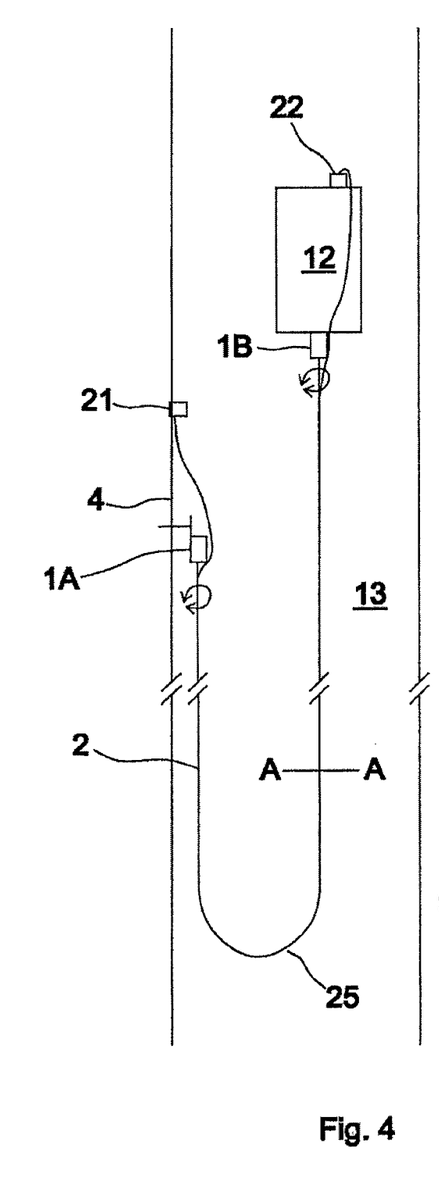
FIGS. 4, 4a present one suspension arrangement according to the invention, as a block diagram
Figure 4A:
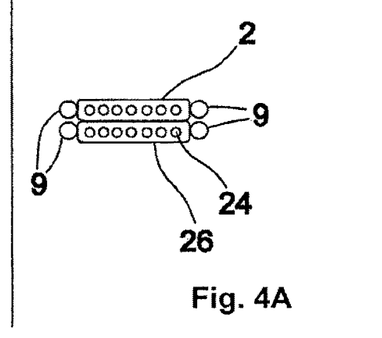

FIG. 4 presents as a block diagram a suspension arrangement for suspending a trailing cable 2 in an elevator hoistway 13. The first end of the trailing cable 2 is suspended in connection with a wall part 4 of the elevator hoistway at approximately the midway point of the elevator hoistway 13 with the first suspension device 1A described in the embodiments of FIGS. 1a, 1b, 1c. From the suspension device 1A the trailing cable is taken to a connector 21, from where the signals of the trailing cable are taken to an elevator control unit (not shown in figure). The second end of the trailing cable 2 is suspended in connection with the elevator car 12 with the second suspension device 1B described in the embodiments of FIGS. 3a, 3b, 3c. From the suspension device 1B the trailing cable is taken to a connector of the control unit 22 of the elevator car, for connecting the signaling of the elevator car 12. FIG. 4 also presents a cross-section of a trailing cable in the direction A-A. The trailing cable 2 comprises two flat cables connected to each other, in which the electricity supply and control signals 24 travel between the elevator control unit (not shown in figure) and the control unit 22 of the elevator car. In addition, supporting wires 9 are fixed to the trailing cable 2, which support the trailing cable 2. Supporting wires 9 of a trailing cable are used particularly with large travel heights, such as in skyscrapers, in which the self-weight of long trailing cables 2 might grow to be so large that the trailing cables or the suspension devices of the trailing cables will not otherwise endure the stress produced by gravity.

When a trailing cable 2 is suspended in the elevator hoistway 13, usually at least a certain amount of twisting remains in the trailing cable. To illustrate this fact, FIG. 5b presents the suspension arrangement of FIG. 4 as seen from above the elevator hoistway 13. When viewed from above, the suspension devices 1A, 1B are situated at a set angle $\epsilon$ overlapping with respect to each other. If the flat cable that functions as a trailing cable 2 is fixed at its suspension points such that the wide side 26 of the flat cable becomes parallel with the wall 4 of the elevator hoistway, twisting remains in this case in the flat cable 2, which twisting is produced by the aforementioned overlapping position of the suspension devices 1A, 1B with respect to each other. When the elevator car moves, the centrifugal force acting at the direction change point 25 of the trailing cable causes swinging in different directions in a twisted trailing cable 2. The swinging can be substantially reduced by removing the twisting of the trailing cable 2 by adjusting the angle of rotation $\gamma$ of the trailing cable by turning the fixing part 6 of the trailing cable in both the first 1A and the second 1B suspension device in relation to the adaptor 14, 15, 19, 20 around an essentially vertical axis of rotation. After the twisting has been removed, the fixing part 6 of the trailing cable is locked to the adaptor 14, 15, 19, 20 with roll pins 16. In this case the wide sides 26 of the flat cable 2 used as a trailing cable are in the first 1A and in the second 1B suspension device essentially parallel with each other.

Figure 5A:
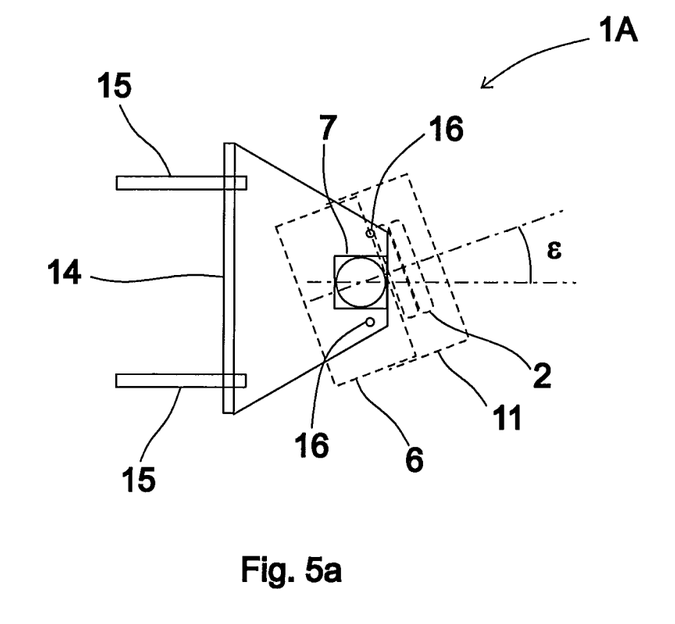
FIGS. 5a, 5b illustrate the operation of a suspension device according to the invention
Figure 5B:
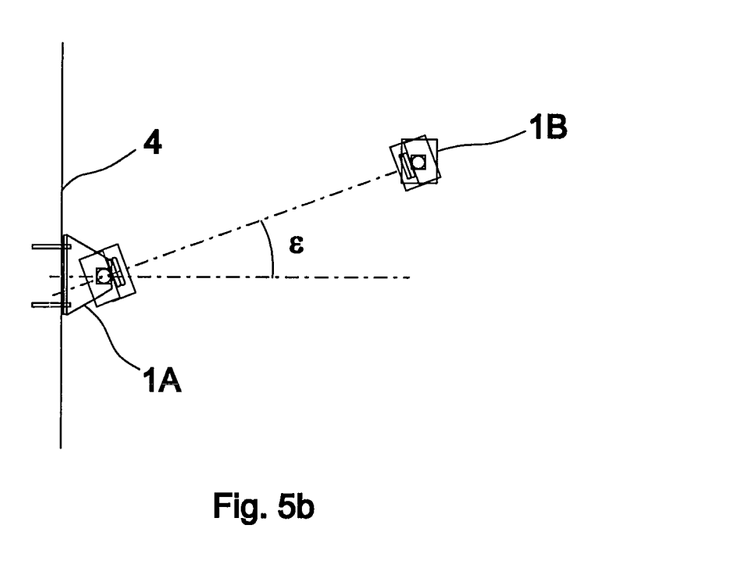

FIG. 5a presents a first suspension device 1A locked into its final position with roll pins 16 after the twisting of the trailing cable 2 has been removed in the manner described in the embodiment of FIG. 5b. The second suspension device 1B is locked into its final position in a corresponding manner with roll pins, which pass through the fixing plate 19 and the fixing part 6 of the trailing cable.

The invention is not limited solely to the embodiments described above, but instead many variations are possible within the scope of the inventive concept defined by the claims below.

The invention claimed is:

1. A suspension device for suspending a cable in an elevator hoistway, which suspension device comprises:
    an adaptor for fixing the suspension device to a supporting structure, the adaptor being configured to not move relative to the supporting structure, the adaptor being configured to cooperate with a fixing part of the cable, wherein the fixing part of the cable is made to be turnable in relation to the adaptor for adjusting an angle of rotation of the cable; and
    a locking mechanism configured to lock a position of the fixing part of the cable relative to the adaptor,
    wherein the fixing part of the cable is connected to the adaptor via a bearing, and
    wherein the fixing part of the cable comprises a flexible flap.

2. The suspension device according to claim 1, wherein the fixing part of the cable includes a mechanism to fix a supporting wire of the cable.

3. The suspension device according to claim 2, wherein the mechanism includes a fixing wheel.

4. The suspension device according to claim 1, wherein the fixing part of the cable is fitted to turn in relation to the adaptor around an essentially vertical axis of rotation.

5. The suspension device according to claim 1, wherein the flexible flap is made of rubber.

6. The suspension device according to claim 1, wherein the suspension device comprises a cable trough, and the aforementioned cable trough is fixed to the fixing part of the cable.

7. The suspension device according to claim 1, wherein the fixing part of the cable is fitted to turn in relation to the adaptor around an essentially vertical axis of rotation.

8. A suspension arrangement for suspending a trailing cable in an elevator system, which elevator system comprises an elevator car to be moved in an essentially vertical direction in an elevator hoistway, wherein the suspension arrangement includes:
    a first suspension device for suspending a first end of the trailing cable in connection with a supporting structure of the elevator hoistway, the first suspension device includes:
        a first adaptor to fix the first suspension device to the supporting structure, the first adaptor being configured to not move relative to the supporting structure, the first adaptor being configured to cooperate with a first fixing part of the trailing cable, wherein the first fixing part of the trailing cable is made to be turnable in relation to the first adaptor to adjust an angle of rotation of the trailing cable; and a first locking mechanism configured to lock the position of the first fixing part of the cable relative to the first adaptor; and a second suspension device for suspending a second end of the trailing cable in connection with the elevator car, the second suspension device includes:

a second adaptor to fix the second suspension device to the elevator car, the second adaptor being configured to cooperate with a second fixing part of the trailing cable, wherein the second fixing part of the trailing cable is made to be turnable in relation to the second adaptor to adjust the angle of rotation of the trailing cable; and a second locking mechanism configured to lock the position of the second fixing part of the trailing cable relative to the second adaptor, wherein the first fixing part of the trailing cable is connected to the first adaptor via a bearing, and wherein the first fixing part of the trailing cable comprises a flexible flap.

9. The suspension arrangement according to claim 8, wherein the second adaptor includes a fixing plate, for fixing the second suspension device to a horizontal part of a supporting structure of the elevator car.

10. A suspension arrangement for suspending a trailing cable in an elevator system, which elevator system comprises an elevator car to be moved in an essentially vertical direction in an elevator hoistway, wherein the suspension arrangement includes:

a first suspension device for suspending a first end of the trailing cable in connection with a supporting structure of the elevator hoistway, the first suspension device includes:

a first adaptor to fix the first suspension device to the supporting structure, the first adaptor being configured to not move relative to the supporting structure, the first adaptor being configured to cooperate with a first fixing part of the trailing cable, wherein the first fixing part of the trailing cable is made to be turnable in relation to the first adaptor to adjust an angle of rotation of the trailing cable; and a first locking mechanism configured to lock the position of the first fixing part of the cable relative to the first adaptor; and a second suspension device for suspending a second end of the trailing cable in connection with the elevator car, the second suspension device includes:

a second adaptor to fix the second suspension device to the elevator car, the second adaptor being configured to cooperate with a second fixing part of the trailing cable, wherein the second fixing part of the trailing cable is made to be turnable in relation to the second adaptor to adjust the angle of rotation of the trailing cable; and a second locking mechanism configured to lock the position of the second fixing part of the trailing cable relative to the second adaptor, wherein the first adaptor includes an L-shaped fixing member, and in that the first fixing part of the cable is connected to a part to be installed horizontally of the L-shaped fixing member via a bearing, and in that holes for fixing pins have been made in a part to be installed vertically of the L-shaped fixing member, for fixing the L-shaped fixing member to the supporting structure of the elevator hoistway, and wherein the supporting structure is vertically aligned.

11. A suspension device for suspending a cable in an elevator hoistway, which suspension device comprises:

an adaptor for fixing the suspension device to a supporting structure, the adaptor being configured to not move relative to the supporting structure, the adaptor being configured to cooperate with a fixing part of the cable, wherein the fixing part of the cable is made to be turnable about a fixed pivot point in relation to the adaptor for adjusting an angle of rotation of the cable to be suspended, wherein the fixing part of the cable is connected to the adaptor via a bearing, and wherein the fixing part of the cable comprises a flexible flap.

* * * * *